Dec. 15, 1925.

A. BROCK, JR., ET AL 1,565,413

METHOD OF MAKING MAPS

Filed Feb. 16, 1924    5 Sheets-Sheet 1

INVENTORS
Arthur Brock Jr.
Lodewyk J.R. Holst
BY
ATTORNEY

Dec. 15, 1925

A. BROCK, JR., ET AL

METHOD OF MAKING MAPS

Filed Feb. 16, 1924

A. BROCK, JR., ET AL 1,565,413

METHOD OF MAKING MAPS

Filed Feb. 16, 1924

INVENTORS.
Arthur Brock Jr.
Lodewyk J. R. Holst.
BY

ATTORNEY

Patented Dec. 15, 1925.                                   1,565,413

UNITED STATES PATENT OFFICE.

ARTHUR BROCK, JR., AND LODEWYK J. R. HOLST, OF PHILADELPHIA, PENNSYLVANIA, ASSIGNORS, BY MESNE ASSIGNMENTS, TO BROCK & WEYMOUTH, INCORPORATED, A CORPORATION OF DELAWARE.

METHOD OF MAKING MAPS.

Application filed February 16, 1924. Serial No. 693,191.

*To all whom it may concern:*

Be it known that we, ARTHUR BROCK, Jr., and LODEWYK J. R. HOLST, both citizens of the United States, and residents of the city and county of Philadelphia, State of Pennsylvania, have invented certain new and useful Improvements in Methods of Making Maps, of which the following is a true and exact description, reference being had to the accompanying drawings, which form a part thereof.

Our invention relates to a method of making maps from aerial photographs.

It is well known that a series of overlapping views of a territory may be joined up to form a so-called mosaic map of that territory.

Views used for this purpose are obtained by means of cameras carried in aeroplanes or air ships, the lens pointing downward and the focal plane being kept as near as possible horizontal.

Such mosaics, however, are not maps in the technical sense of that word, for three principal reasons, besides other less important circumstances.

The three principal reasons are: That mosaics show points as located by conical-projection from the several successive lens centers as points of view, whereas a map is a plan view in orthographic projection; that mosaics show no elevation contours, whereas maps are not complete without showing contour lines, and that owing to the impossibility to maintain true horizontality of the focal plane, the various image points are of necessity mislocated on the several views.

Attempts have heretofore been made to overcome the difficulties noted, but, so far as we know, without practical success.

The object of our invention is to provide a method of taking, reprojecting and utilizing aerial photographs which will, in the first place, result in producing a series of stereoscopic pairs of plates covering the territory to be mapped, which pairs of plates will be as to the territory to be mapped quite close approximations to horizontal projections, and the steps by means of which we are enabled to secure such pairs constitute the main feature of our invention. A further object which we have in view is the utilization of the reprojected stereoscopic pairs of plates in a stereoscope of special construction, and in a special way so as to obtain a clear visual showing of the contour of the territory shown and to draw contour lines on one of the plates of each pair. A further object is the utilization of our reprojected plates for plotting therefrom a map in orthographic projection, showing the correct location thereon of salient points common to the pairs of plates and also to correctly plot on said orthographic map the contour lines drawn on the plates, and other desirable details photographically shown. A still further object is to utilize the reprojected plates in the preparation of a mosaic map in conical projection suitable for conjoint use with the orthographic map to show contours, as well as details which cannot be conveniently transferred to the orthographic map.

The nature and features of our newly invented method by means of which we effect the above stated objects, will be best understood as described in connection with the drawings in which

Figure 6 is a diagrammatic view showing a template made from the master plate of a pair, and the negative of the other plate and parts of a correction printer mechanism, whereby the template can be angularly adjusted so that the projected image of the negative will fall upon it in such manner that the ordinates of salient points will coincide in distance from the line connecting the points indicating the center and conjugate center on the template with the same points as shown on the template and also in such manner that the parallaxes of points of known elevation will show correctly on the template.

Figure 6ª is a perspective view of a ground glass screen used in connection with a correction printer shown in Figure 6.

$y$—$y$ indicates the transverse axis passing through the center of the view and $y^1$, $y^1$, is a line parallel to the transverse axis passing through the conjugate center point of the other view of the pair.

1, 2, 3, 4, etc., indicate the successively taken overlapping negatives. $C^1$, $C^2$, $C^3$, etc., are the center points of each view and $c^1$, $c^2$, $c^3$, etc., are the conjugate centers as they occur or appear on other views. $x$—$x$ is a line connecting the center and conjugate center of the pair of selected views corresponding to the line of flight and the longitudinal axis of the views. $A^1$, $A^2$, $A^3$, etc., are salient points or objects showing in the views selected in or close to the transverse axis $y$—$y$ and as near as practicable to the top and bottom of the views. B, $B^1$, etc., are other salient points or objects appearing in selected pairs and marked for purposes to be described.

Figure 5:
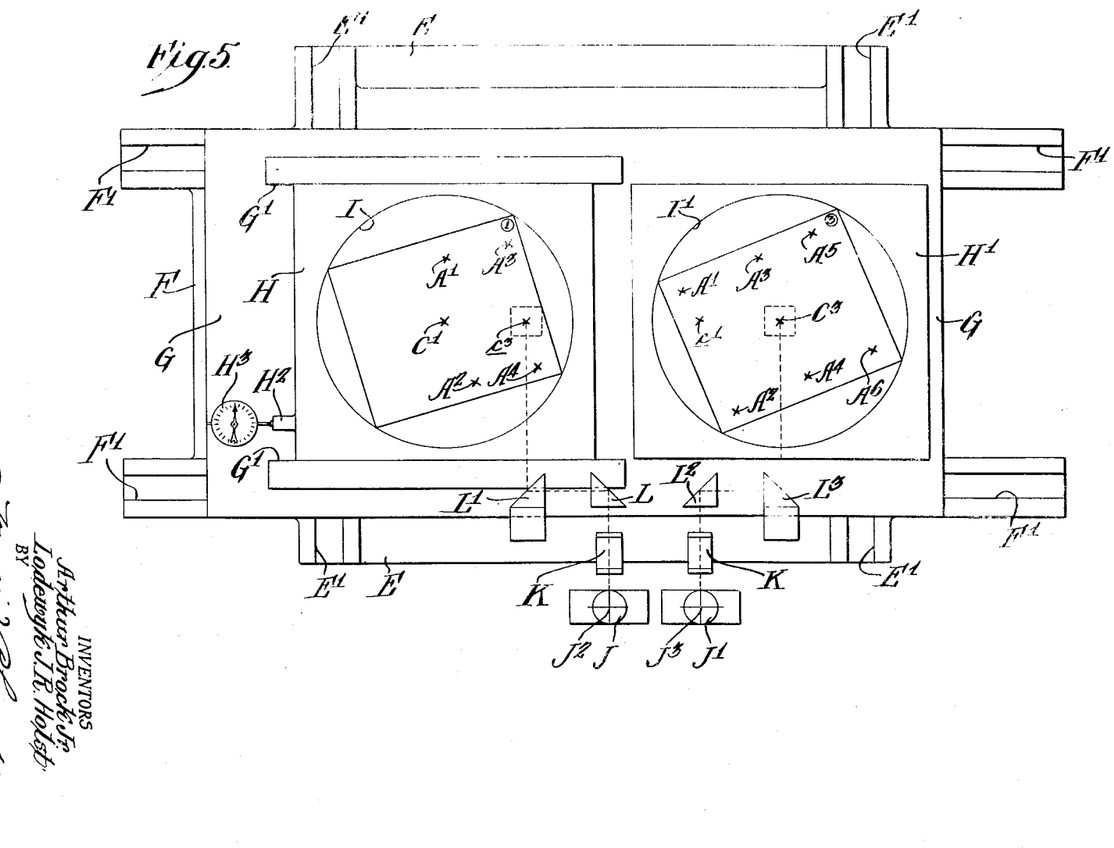
Figure 5 is a diagrammatic view of a stereoscope suitable for use in our method for observing the deviation of the plates of a selected pair from true horizontal projections, and also suitable for observing and drawing the contour lines on the reprojected views of our stereoscopic pairs. The pair of plates is shown in proper alignment for stereoscopic examination.

E, Fig. 5, is the base plate of a stereoscope having guidways $E^1$, $E^1$. F is a table movable on guideways $E^1$ and having longitudinal guideways $F^1$, $F^1$, on which is movably supported a table G having longitudinal guideways $G^1$, $G^1$. H and $H^1$ are turntable supports, the one indicated at H being adjustable on guideways $G^1$ and the one indicated at $H^1$ being fixed to support table G. $H^2$ is a contact arm on the adjustable support H and $H^3$ is a dial micrometer by means of which the extent of adjustment is nicely measured. I and $I^1$ are turntables to which the plates to be studied are secured. J and $J^1$ are the eye pieces of the stereoscope having cross hairs $J^2$ and $J^3$ at right angles to each other. K, K, are lenses and L, $L^1$, $L^2$, and $L^3$ form a prism system to re-erect the images viewed through the eye pieces.

Figures 6, 6A:
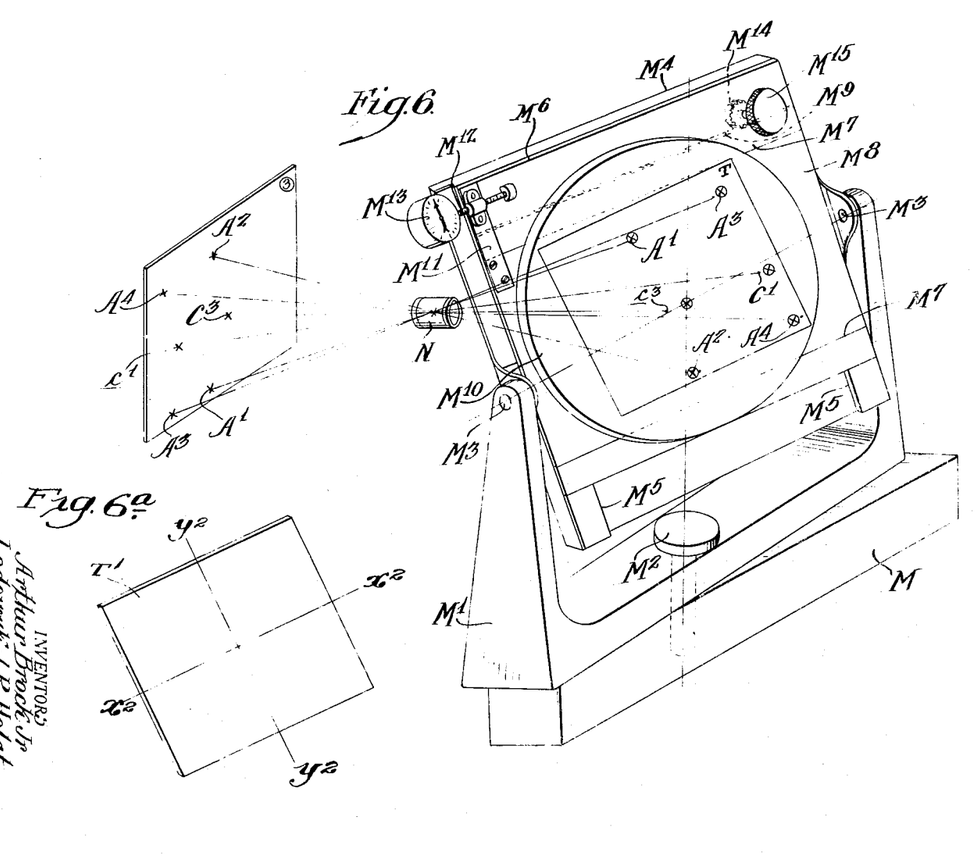

M, Fig. 6, is the base plate of a correction printer on which is supported a frame $M^1$ pivoted to the base at $M^2$ and carrying right angle pivots $M^3$ supporting frame $M^4$ having vertical guideways $M^5$ in which is movably supported frame $M^6$ having horizontal guideways $M^7$ in which is movably supported frame $M^8$, having a rack $M^9$ at its top edge and supporting a turntable $M^{10}$. $M^{11}$ is an arm secured to frame $M^8$ carrying a butting screw $M^{12}$ by means of which the dial micrometer $M^{13}$ is actuated. $M^{14}$ is a pinion journalled on frame $M^8$ engaging rack $M^9$ and actuated by knob $M^{15}$. N is the projecting lens of the instrument which includes also holding and adjusting mechanims for the negative indicated in Fig. 6 at (3) which mechanism is generally similar to that shown in the described portion of the machine, except that no provision is made for tilting the negative. It is, we think, unnecessary to show this mechanism in detail.

Figure 4:
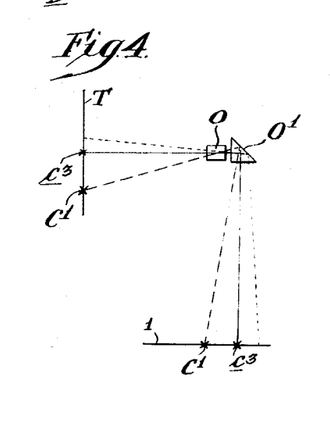
Figure 4 is a diagrammatic view illustrating the way in which the template of Fig. 3, is exposed from the master plate.

O, Fig. 4, is a lens and $O^1$ a total reflecting prism. 1 in this figure represents a positive of view 1 and T the template which we make from this positive.

Figure 3:
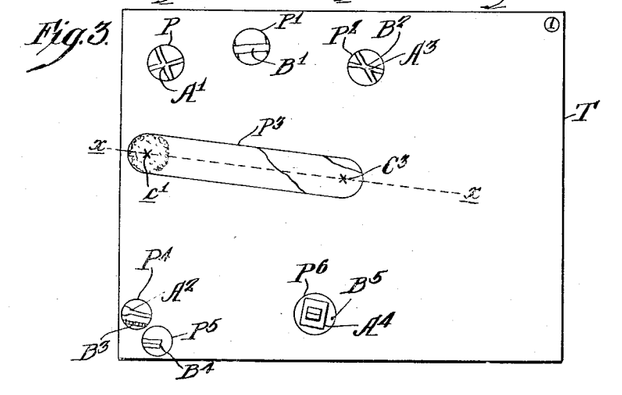
Figure 3 is a view of the template, positive in point location and negative in color, which we make from the master plate of a selected pair and use in obtaining a proper reprojection of the other plate of the pair.

P, $P^1$, etc., Fig. 3, represent the portions of plate 1 which are left uncovered by the stencil paper and are consequently shown on the template T.

Figure 1:
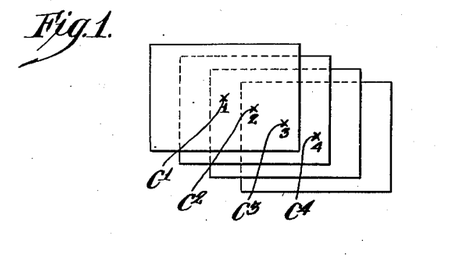
Figure 1 is a diagrammatic view showing a series of photographic negatives exposed from an aeroplane in such manner that the same territory is shown on alternate views and at opposite ends of said views, and also in such manner that each of said alternate views includes the point which lies at the center of the other view.

The first step in our process consists in exposing in a suitable aerial camera a series of negatives, preferably regulating the time interval between succeeding exposures so, that each view contains the point corresponding to the center of the second following view. Figure 1 illustrates four views of such a series, and shows that the center of the third view falls within the confines of the first view, that of the fourth view within the confines of the second view, and so on. In case any unobserved increase in the ground speed of the aerial vehicle, or lowering of the altitude of the flight should occur, this insures that the center of the succeeding view will always be shown on the preceding one, consequently the danger of a break in the continuity of a series is obviated in this way. It is not enough that pairs of views contain in part the same territory, but it is also necessary that the center point of each view be shown on the other one of each pair. To ascertain if this is the case we mark the center of each negative and they are then examined to see if the center of negative number three is visible in negative number one, and so on. Negatives numbered 2, 4, 6, 8, etc., are similarly examined, and on finding that either the odd or the even numbers form an unbroken series as required, one of these sets is selected for further treatment. It occurs in practice that the odd set, for instance, continues unbroken to say number 51, but that number 53 is too far from number 51 for this latter plate to show the center point of number 53. In that case at this point we continue with the even series, beginning with 52 and continuing till the end, unless a break might occur further on in the even numbered series, in which case at that point we would again use the odd series. In this manner we obtain a continuous set of views throughout the length of the flight, suitable for further treatment and have eliminated all superfluous ones.

Figure 2:
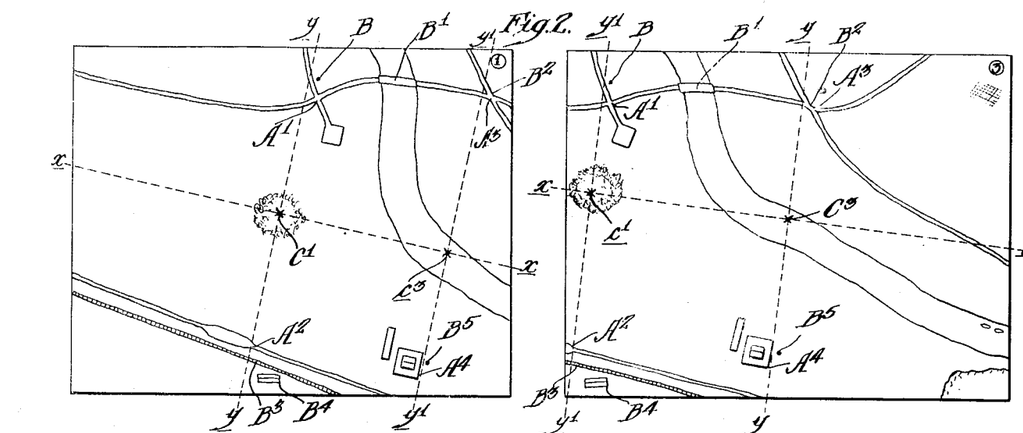
Figure 2 is a view of two alternate negatives showing salient points thereon which are selected and used in our process.

Contact prints on paper, and glass-positives by projection are now made of all selected negatives. The glass-positives, further on simply called positives, are now examined two by two, thus, for instance, 1 and 3, 3 and 5, 5 and 7, and so on, by laying them side by side on a glass table, illuminated from below, to first mark on each positive by means of a pencil-circle, the approximate position of the conjugate center point of the other plate in each pair so examined, and then we select, preferably four, prominent and easily identifiable image points occurring in both views, and located as nearly as feasible in lines $y$—$y$ and $y^1$—$y^1$ passing through the center and conjugate center of each plate at right angles to the line uniting these centers, as illustrated in Figure 2. These points $A^1$, $A^2$, etc., are then marked on the paper-prints, which are given to field parties for the purpose of ascertaining the elevation of points so selected. The determination of the elevation of these selected points is an important feature of our method.

The knowledge of the relative elevation of these points together with a property of conical projections of the same objects taken from separate view points enables us to apply to each plate simple tests by means of the stereoscope, Fig. 5, specially designed to carry out some of the steps of this method. These tests reveal whether or not a positive is a horizontal projection of the view contained on it, and whenever this is not so, to what approximate extent and direction such plate deviates from horizontality.

Figure 7:
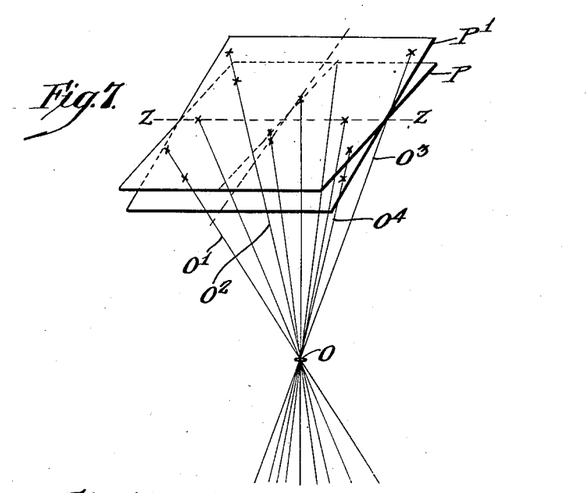
Figure 7 is a diagrammatic view in perspective to illustrate the effect on the location of image points of a tilted plane of projection as compared to a horizontal plane of projection.

A study of Fig. 7 in which the plane P is horizontal and plane $P^1$ tilted, will show in what manner image points are displaced as a result of the inclination of the plane of projection. Since all points are formed by rays $O^1$, $O^2$, $O^3$, $O^4$, etc., proceeding from a common apex at O, diverging consequently in their course from this view point to the focal plane, image points $O^2$ and $O^4$ on that side of tilted plane $P^1$ which is higher than the horizontal plane will be shown further apart than $O^2p$ formed by the intersection of rays $O^2$, $O^4$, with the horizontal plane P and these rays; the reverse holds for image points $O^1p^1$ and $O^3p^1$ on that section of the tilted plane $P^1$ which is lower than the horizontal plane. Points in the line constituting the trace Z, Z, of the horizontal plane with the tilted plane have undergone no displacement, since they are in fact in the horizontal plane.

It will now be seen that when parallaxes measured between points in the $y$—$y$ axes above and below the center point of one of the plates, and their conjugates, necessarily located near the upper and lower margins and near the side edge of the other plate, agree with calculated parallaxes for these points, the latter of these two plates must be very approximately horizontal even if parallaxes on other points common to such a pair differ widely from the correct values. Such differences are then occasioned by the tilted plane of projection of the other plate of such pair. The points situated in or near the line $y$—$y$ passing normally to the flying line $C^1$—$c^3$ in the point $C^1$ on plate No. 1, Fig. 2, cannot have been moved out of this line by tilt, since inclination of this plane in the $y$—$y$ axis does not displace them at all and inclination around the $x$—$x$ axes only displaces these points upward or downward along the $y$—$y$ axis. Their location in a direction parallel to the flying line remains therefore undisturbed by whatever tilt might be in the plane of No. 1 plate when the exposure took place. Correct parallaxes of these points and their conjugates are then only possible when the conjugate points appear on the other plate in their correct positions. As shown by Fig. 7, that is only possible in the case of points in or near the corners of a view, when its projection is on a horizontal plane. In this manner it is thus readily ascertained if either one or both plates of a pair approaches horizontality of its plane of projection. These geometric properties of conjugate points form the theoretical basis upon which our novel method has been developed.

We will now explain how a pair of positive plates having salient points of ascertained elevation is adjusted and studied in the stereoscope in order to ascertain what if any reprojection of the plates is required.

The plates are placed on the turntables so that the conjugate center points $c^1$ and $c^3$ are inside of the centers $C^1$ and $C^3$ and so that these four points are in correct alignment with each other. This is achieved by placing the center of each plate in the center of rotation of its turntable, then operating the cross-slide C until these centers are seen to lay in the horizontal lines of the cross-hairs.

The transverse slide G is then operated until the center of one of the plates, for instance, No. 3, coincides with the intersection of the cross hairs in the eye-piece $J^1$, and the turntable $L^1$ is then rotated until the conjugate image point $c^1$ on plate 3 is seen to exactly lay in the horizontal hair line of $J^1$. In case the distance $C^3$ $c^1$ is too large to permit seeing both points $C^3$ and $c^1$ in the same adjustment of the transverse slide G, the latter is displaced sufficiently to bring the point $c^1$ within the field of the telescope system $E^1$. Having adjusted plate 3 in this manner the same operations are repeated with plate 1, and thereupon the independent adjustment of the slide $G^1$ is operated as much as is required to bring the conjugate image point $c^3$ on plate 1 in coincidence with the cross hair intersection of the eye piece J, after the center $C^3$ of plate 3 has been brought to coincidence with the cross hair intersection of $J^1$. This completes the plate adjustment as diagrammatically illustrated in Fig. 5.

The dial of the micometer $H^3$ is set to zero, and the slide G is shifted until $c^1$ on plate 3 presents itself in the center of the eye piece $J^1$. The center $C^1$ on plate No. 1 will now not coincide with the center of the eye piece J, unless the distances $c^1$—$C^3$ and $C^1$—$c^3$ on plates 3 and 1 respectively happen to be the same.

If the plates must be further separated to bring $C^1$ in the center of J, the ground at $C^1$ is higher than the ground at $C^3$ and when the plates must come nearer together in order to effect this simultaneous coincidence $C^1$ is lower than $C^3$. The difference in distance between two such pairs of conjugate image points is called the parallax of these points, and is a function of the base-length $C^1$, $C^3$, the elevation of the view point above the ground and the difference in the elevation of the ground points. The relative elevation of a center point so selected with relation to the points of known elevation is now determined by setting the dial micrometer at zero, when, in the case of this example, the point $C^1$ on plate No. 1 and $c^1$ on plate No. 3, are placed in coincidence with their respective cross hairs. The cross slides and slide $G^1$ are now operated until the point of known elevation nearest to that of $c^1$ and $C^1$ is in coincidence with these cross hairs. The micrometer reading will then indicate the parallax between this point and the center C,—when this is a positive parallax C is lower than the point in question by the amount corresponding to the parallax and in case the micrometer shows a negative reading the center $C^1$ is higher than the point of known elevation by the amount corresponding to the parallax difference so found. We now ascertain by direct measurement on the plate whose own center is lower than the conjugate center, the distance between these two points, and on the basis of this distance read in previously prepared parallax tables what the parallax difference must be for the various salient points of which elevations were measured in the field. The cross slides F and G and slide $G^1$ are operated until the lowest of these salient points say, for instance, $A^1$, Fig. 2, is on each plate in coincidence with the vertical cross hair line, and in this position the micrometer dial is now placed at zero. Let us assume that the base length is 2.5 inches, that $C^1$ is the lower center point, and that the elevations of the points $A^1$, $A^2$, $A^3$ and $A^4$ are respectively 157 ft., 171 ft., 213 ft., and 165 ft. above the center point elevation of $C'$. The parallax tables indicate .081", .089", .111" and .085" to be the parallaxes corresponding to these elevations. Consequently if the dial be set at zero when the plates are placed as described, the points $A^2$, $A^3$ and $A^4$ and their conjugates must respectively be .008" .030" and .004" further apart than points $A^1$. Furthermore the laws of conical projection on horizontal planes require that the distances of all conjugate points, measured to the lines uniting the centers of the views, viz, the lines $C^1$, $c^3$ and $C^3$, $c^1$, to be the same in each view, thus the height of $A^1$ above the line $C^1$, $c^3$, should equal the height of $A^1$ above the line $C^3$, $c^1$. Operation of the cross slides F and G will bring any desired point in the horizontal hair line, and if the conjugate point be then also in the horizontal hair line, the ordinates of such points are alike. In case of inequality the amount and the direction of the differences is noted, but not measured. The observation of the discrepancies in ordinates of points as remote as possible from the central line $C^1$, $C^3$, is indicative of the relative position of the planes in which each view is projected, and further information is furnished by the agreement or non-agreement of the parallaxes of points $A^1$, $A^2$, $A^3$ and $A^4$, as measured on the plates, and as determined by the tables. Actual measurement of such deviations could be used for calculating the position of each plane, of projection, but since these calculations are exceedingly intricate and laborious, and the results are moreover materially affected by errors in point measurements as small as .0001", the mathematical method of solving the plane of projection does not lead to satisfactory practical results. Our method, therefore, proceeds by empirical correction, based on the conditions disclosed by the preliminary examination of each pair just now explained.

The results of this observation enable the observer to class each pair in either one of three classes of pairs, namely, each plate is in a plane of projection close to horizontality; one of the plates is close to horizontality and the other is not, or both plates are far from horizontality. The further steps in our method are adapted to deal properly with each class, and consists in a reprojection of the negatives of plates found to be faulty, on templates of plates found to be serviceable, so as to thereby produce pairs of plates which will show throughout their common territory equal ordinates and correct parallaxes for the points of known elevation. Such pairs must be so far as this territory is concerned, very close approximations to two horizontal projections, since only horizontal projections can simultaneously fulfill both these conditions.

Before removing a pair of plates from the stereoscope, after the preliminary examination has been made, this instrument is used to locate and mark with extreme precision, the exact conjugate center points in each plate of the pair. It frequently happens that the center point of a plate is in the tree tops, a lake, a river, or a field, in such manner that ordinary visual observation does not suffice to exactly locate the corresponding image point in the adjoining plate. In this and in any other instances the stereoscope furnishes the means to exactly locate the conjugate point. This is accomplished by first ascertaining by means of the ordinates of points near to the $C^1$, $c^3$ and $c^1$ $C^3$, that the alignment of the plates is perfect. If now $C^3$ is in a tree-top, the plate No. 1 is brought to such separation from plate No. 3 that the stereoscopic image of the cross hairs appears in contact with the tree-top center of $c^3$. In case the plate No. 1 is too near plate 3, the cross hairs will appear below the tree top; when the plates are too far apart the cross hair appears to float in the air above the tree top, and only in the point of correct distance will the cross hairs appear in contact with it. The cross-hairs in eye piece J are now exactly in the conjugate point $c^3$, and with the help of a razor-edged knife this point is marked on plate No. 1, a suitable guide for this knife being laid on the plate to coincide with the cross hair intersection by looking through eye piece J only. A cross having the position of the mark used to indicate multiplication is thus produced in exact concentricity with the cross formed by the cross hairs which occupies the position of the cross used to indicate addition. The slide G is thereupon shifted until the center $C^1$ of plate No. 1 coincides with its cross hair intersection, and similar operation will then locate $c^1$ on plate No. 3. If now, for instance, $C^1$ should lay in a river, or in a lake, it would not be possible to directly find the conjugate point with great precision, as the plates are not yet corrected. Therefore the cross-slides are now operated until a point as near as possible to $C^1$ where land and water meet, and consequently in the same elevation as the lake or the river, is in the cross hair center. The plate separation is then adjusted until the selected point and its conjugate, each coincide with their respective cross-hairs, and then the center of $C^1$ is again shifted to coincidence with its cross-hairs by operation of the cross-slides F and G, taking care not to disturb the separation just determined. The cross hairs in $J^1$ will then coincide with $c^1$, on plate No. 3, as soon as the point $C^1$ on plate No. 1 arrives on the cross-hair intersection of J. This step in our method is of great importance for the success of following steps required for the correction as well as for the subsequent plotting of corrected plates to form a photographic traverse which serves as the framework for the map in orthographic projection, which is the ultimate result of our method. Heretofore the inability to correctly transfer the conjugate centers by ordinary ocular observation, lead to the use of substitute centers, being points in the vicinity of the center and sufficiently definite to permit locating their conjugates. Certain errors are thereby introduced in the plotted drawings, resulting in mis-orientation of plotted points. Especially when there is considerable difference in the ground elevation of the true center and of the substitute center, such errors can become quite important. The stereoscopic location of the true conjugate centers is therefore an important improvement accomplished by our method.

The plates belonging to the first of the three classes above mentioned are recognized by the fact that they show during the preliminary examination correct parallaxes for the points of known elevation and equal ordinates for all conjugate image points. They can be used in the further steps of this process without needing reprojection.

Of pairs classed in class two, which is found in practice to be of most frequent occurrence, the plate which on examination proved itself to be practically horizontal, is used to determine the plane in which the negative of the other plate of that pair must be reprojected so as to produce a picture that will have equal ordinates and correct parallaxes throughout the territory common to both plates.

Assuming that plates 1 and 3 are in observation, and that the parallaxes of points located in or near the $y$—$y$ axes and as far from the line C—$C^1$ as possible, having consequently their conjugates near the left hand margin of plate No. 3, are found not to correspond to the calculated parallaxes, but that points situated in or near the $y—y$ axis of plate No. 3 and having their conjugates near the right hand margin of plate No. 1 agree with the calculated parallax, then it may be concluded that plate No. 1 is very nearly if not correctly horizontal, and that plate No. 3 is tilted.

This conclusion is reached from the facts that the tilting of plate No. 3 around the $y—y$ axis with or without additional tilt around the $x—x$ axis has not displaced points out of the $y—y$ axis. If thus the parallax of such points is correct, it means that the conjugate points near the margin of plate No. 1 are in their correct location and that is possible only when plate No. 1 is horizontal. The wrong parallaxes found for points near the margin of plate No. 3 are due to the wrong location of these points, caused by the tilt of plate No. 3. In our new method the correction of such plates is done as follows:

A sheet of non-actinically colored transparent paper is laid on the plate of best approach to horizontality and then the center of this plate, the conjugate center of the paired plate, the prominent points of known elevation, and such other points as may be useful to compare ordinates are all marked and this paper is then perforated in these spots. This stencil is then attached to the glass-side of the plate, so that the regions around the marked points are uncovered by the perforations.

So prepared, this plate is inserted in a template printer, Fig. 4, which is a projecting printer having a 45° total reflection prism $O^1$ in front of the lens O, and with front and back focal distances adjusted to produce exactly equal sized reproductions. The focal plane receiving the glass-plate T which is to be exposed to the stencil protected positive 1, is arranged so that the physical center of this glass plate will receive the image of the conjugate center of the stencil carrying master plate. Upon development of such exposure there has been made a photographic template, negative in color, but positive as regards relative point location.

The next step consists in placing the negative of the plate 3, for example, which must be corrected in the projecting printer, Fig. 6, adjusting it so that its center coincides with the optical axis of the lens N, and bringing the conjugate center $c^1$ of the master plate in the line corresponding to the axis of rotation $M^3$ of the frame $M^4$, all as diagrammatically illustrated in Fig. 6, where 3 represents the negative and T represents the template produced as just explained.

The correcting printer is provided with the required means, not shown, to rotate and slide the negative to its proper position, and the template T is supported in a frame $M^{10}$ adapted to interchangeably support a ground glass screen, $T^1$, Figure $6^a$. This ground glass screen is provided with horizontal and vertical center line markings $x^2$, $x^2$ and $y^2$, $y^2$, and the zero positions of the tilting, rotating and sliding mechanisms provided for this ground glass screen are so regulated, that the intersection of these two lines coincides with the lens axis and that the horizontal and vertical lines respectively coincide with the horizontal and vertical axis of rotation $M^3$ and $M^2$ of this screen. It follows that rotation in either or both axes will not cause any displacement of the intersection point of the two axes, which will then always be in the lens axis, unless slid away from its zero position along either of these axes.

The flying line $C^3$, $c^1$, of the negative is adjusted to coincide with the $x—x$ line on the screen, and the point $C^3$ is adjusted to project itself in the intersection of the $x—x$ and $y—y$ axis of the ground glass screen adjusted in zero position. The ground glass screen is then removed, and the template previously prepared adjusted in its place. If necessary the template is rotated around the lens axis, to make the image points $C^3$ and $C^1$ contained thereon, coincide with the $x—x$ axis of the instrument. Operation of the parallax screw $M^{15}$ will cause the center points as photographed on the template to slide across the conjugate points projected thereon by the negative and exact coincidence of the flying line of the template and of the negative is secured in this manner. Since the parallaxes are measured in directions parallel to the flying line, the displacements of the template T along the $x—x$ axis will yield the various parallax readings by the aid of the micrometer $M^{13}$, Fig. 6.

The diagram shows the template so tilted that the ordinates of the photographed and of projected image points as shown at $A^1$, $A^2$, $A^3$ and $A^4$ are equalized. The projected point $A^1$ is in coincidence with the photographed point $A^1$ of the template and the image points $A^2$, $A^3$ and $A^4$ indicate the correct difference in parallax when successively brought to coincidence by operation of the parallax knob $M^{12}$. This position of the plane T has been found by empirical adjustments, suggested to the operator by the results of the preliminary stereoscopic examination. The preliminary stereoscopic examination discloses the trend of the required adjustments and the operation of the parallax slide and the tilting of the template determines the extent to which the known trend must be applied. Having found the correct plane of projection in the manner described, the template is removed and a sensitive plate inserted in its place. The resulting positive will then form with the one from which the template was produced, a stereoscopic pair, to all intents and purposes in horizontal projection throughout the territory shown in common on such pair.

Pairs belonging to the third class are mostly composed of plates having an approximately equal amount of tilt in the $x$—$x$ axis but little or none around the $y$—$y$ axis. Such pairs are recognized by showing very close equality of their ordinates, but considerable errors in the parallaxes, which errors are characterized in that the sign of the error above and below the flying line reverses, or in other words that when the parallaxes above the line are too small, those below the line are too big, or vice-versa. The side of the plates on which the parallaxes are too small is the side which, in the reprojection, should incline toward the lens when the template is made from the left hand plate of the pair in question, and in reverse direction when the template is made of the right hand plate of the pair. This will bring marginal points nearer to the center of the plate, and consequently further from the center of the paired plate. As the ordinates are correct, each plate of such pair should be reprojected under the same angle of inclination around the $x$—$x$ axis, the amount tentatively adjusted in accordance with the magnitude of the parallax errors to be overcome. The two plates so reprojected are then again tested and if found to be still wanting, such further correction as may seem necessary is applied to these reprojected plates in exactly the same manner as described or as used for plates of class two. Proceeding in this manner a series of horizontal equivalents for all pairs needed for the delineation of the entire territory is obtained.

Twofold use is now made of the plates so corrected in the further practice of our new method, first, to obtain the contour lines, and second to convert the conical projection of these plates to the corresponding orthographic projection of the plotted traverse.

To these ends the successive corrected pairs of plates are placed on the stereoscope, carefully lined up as described and any one of the points of known elevation on each plate is brought to coincidence with its eye piece cross hairs. Selecting the corrected pair 1 and 3, the points $A^1$ may be so placed. Their elevation is as ascertained 157 ft. and the 160 ft. contour line must thus be 3 feet higher than the points $A^1$ appear in stereoscopic combination. The base-length being 2.5 inches, the parallax table shows that a rise of 3 ft. is commensurate with a parallax of .0015″. If then first the dial of the micrometer $H^3$ be set to zero, and the independent lateral slide H be operated to make the dial read .0015, the stereoscopic position of the cross hairs will touch the photographic image in all points of 160 ft. elevation, appearing to hang in the air above all lower points and appearing to bury itself below all higher points. Without disturbing the separation between the plates, the slides F and G are now operated to bring different image portions within the field of view. A few points of apparent contact between the cross hairs and the view are marked with blue pencil, and the line passing through all points of equal height is drawn on one of the plates by actual stereoscopic inspection of the view; most frequently, but not necessarily, the contours are drawn on the right hand plate of each pair. Having completed a contour line in any elevation, the plate separation is changed to conform to the parallax of the next higher or next lower contour line, mostly differing 20 ft. in elevation with each other, and the work is repeated as described until all desired contours are drawn. To the experienced operator the stereoscopic effect of the image is so compelling, that he unhesitatingly follows a given contour without error along its entire course within the territory common to the pair in observation. The contour form is also of necessity of far greater precision than is gained by the usual plane table work, by which thus far contours are generally determined. The contours are drawn as observed with fine pointed blue pencil, permitting to completely erase an occasional error. When all contours are drawn to the satisfaction of the observer, the plates are removed from the stereoscope, and with a fine pointed needle the contour lines are scratched in the emulsion of the plate. The blue lines are wiped off with cotton wool, and the scratched contours are clearly seen throughout the light and shade of the view. Plate number three of pair 1 and 3 will, in this manner, show all desired contours in the image portion situated between $c^1$ and $C^3$, and the plate 5 of the pair 3 and 5 will contain the contours as they appear in the section between $c^3$, and $C^5$, each new pair furnishing in this manner the contour lines for the next adjoining section.

The corrected or originally correct plates are also used to furnish the plotting-templates previously mentioned and now more fully to be explained.

Figure 8:
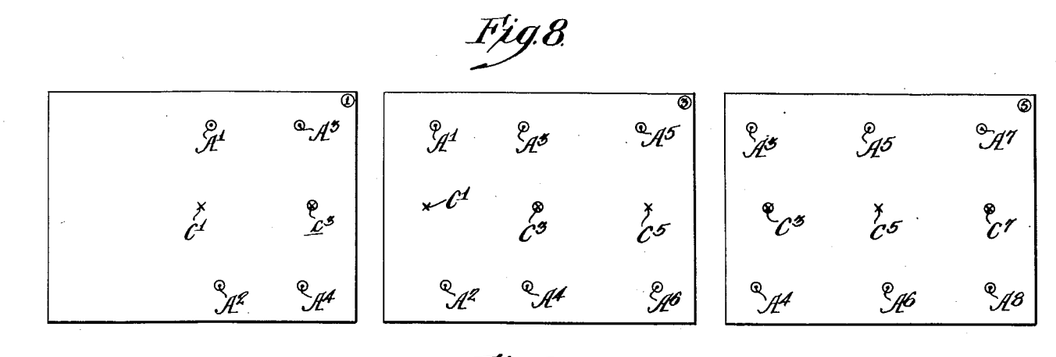
Figure 8 is a diagrammatic illustration of three corrected plates prepared to make the plotting-template tracings thereof.
Figure 9:
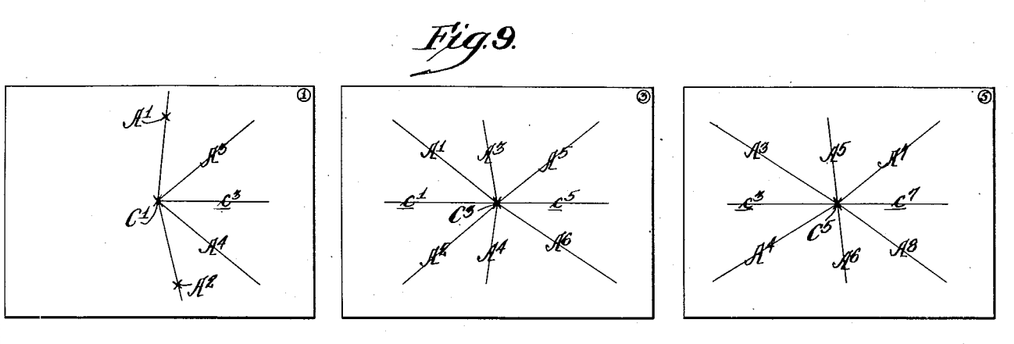
Figure 9 is a diagram of the plotting-template made of the plates shown in Figure 8.
Figure 10:
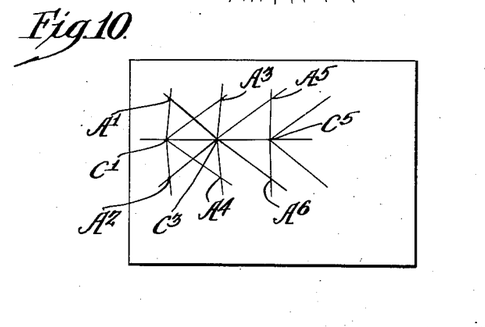
Figure 10 is a diagram of the plotted traverse made by means of the tracings shown in Figure 9.

Either the points of known elevation $A^1$, $A^2$, etc., or other points such as $B^1$, $B^2$, etc., the conjugates whereof may be clearly identified on the preceding and the following plates, are carefully marked by small pin pricks surrounded by little circles scratched around them. Figure 8 diagrammatically illustrates how such a series of points has been selected from among the corrected sets 1—3—5, etc. Be it further assumed that the actual value of the distance on the ground separating the image points $A^1$ and $A^2$, Fig. 8, has been measured, so that the scale of this plate is thereby determined and to be used as the scale of the plotted traverse.

The points selected for plotting are preferably located above and below the centers and conjugate centers of the various plates, and as near the margins as such points can be found. When identified in the adjoining plates they are marked by extremely fine pin pricks in the emulsion, and a little circle scratched around to readily find them through a sheet of well flattened tracing paper, laid on the plate. For instance in plate 1 the points $A^1$ and $A^2$ are directly above and below the center point $C^1$, whereas the points $A^3$ and $A^4$ on plate 1 are conjugate with the points $A^3$ and $A^4$ above and below the center point $C^3$ of plate 3 and so on. The tracings are numbered with the number of the plate on which they are made. Each contains the center point marking of its plate, and lines passing through each one of the points to be plotted and the center. None of these points themselves are marked, except the centers, and on tracing No. 1, the actual position of the points $A^1$ and $A^2$ is most accurately traced. Having in this manner prepared tracings of all the plates used, the first one of these tracings is placed on a sheet of drawing paper, the points $A^1$ and $A^2$ are carefully transferred by fine pin pricks, and taking care that the tracing does not move, the direction $C^1$—$A^3$ and $C^1$—$A^4$, are indicated by pricking near the ends of the respective lines small marks in the drawing paper. These points are surrounded by a pencil circle, and upon removal of the plot-tracing, the points $C^1$, $A^1$ and $A^2$ are marked on the paper as also the directions $C^1$, $A^3$, and $C^1$—$A^4$. The tracing of the plate 3 is now laid on the drawing and the line $C^3$, $c^1$ thereof carefully adjusted in the direction $C^1$, $c^3$ now shown on the drawing. Tracing No. 3 is then moved as much in or out along this line as will be found necessary to make the directions $C^3$—$A^1$ and $C^3$—$A^2$ pass through the points $A^1$ and $A^2$ already established in the plot. When in this position, points are pricked through the end of the other directions shown on tracing No. 3, viz, $C^3$—$A^3$, $C^3$—$A^4$, $C^3$—$c^5$ and $C^3$—$A^5$ and $C^3$—$A^6$, and through the center $C^3$ of this tracing. The latter point will, of course, be located in the line $C^1$—$c^3$ already drawn, and when the direction $C^3$—$A^3$ and $C^3$—$A^4$ are now drawn, intersections will be formed with the previously drawn directions $C^1$—$A^3$ and $C^1$—$A^4$; these intersections locate in orthographic projection, in the scale represented by the distance between the point $A^1$ and $A^2$, the correct location of the photographic points $A^3$ and $A^4$, and $C^3$ of plates 1 and 3. Also the distance between the points $C^1$ and $C^3$ found in this manner is the correct photographic base length of either plate 1 or plate 3, depending upon whether point $C^1$ or point $C^3$ is in the lower elevation and the correctly corresponding scale of the plate having its center point at the higher elevation can now be determined by adding to the distance $C^1$—$C^3$ of the plotted drawing the parallax corresponding to the difference in elevation between the points $C^1$ and $C^3$. In this manner the correct scale equalization of the views may be accomplished and becomes available whenever the most accurate possible mosaic map is to be made. As the plotting is accomplished by means of angular determination of point-location, scale differences, if any, in the photographic plates used are absolutely immaterial, as angles are not changed by scale variations.

The continuation of this method of plotting will thus furnish a photographically produced traverse, instead of the traverses made thus far by means of the various field instruments used by surveyors. Practice has demonstrated that the accuracy of traverses derived in this manner from aerial photographs is not inferior to those produced by prevailing instrumental methods, and not infrequently superior.

The traverse being completed, tracings on cloths are made thereof in sections small enough to be readily handled on a drawing board. The contoured plates are laid under these sectional tracings, oriented correctly by means of their centers, and the plotted points, and such features as are desired to record are now traced off including the contour lines. Wherever points of considerable differences in elevations are present on plates so traced, their photographic distances from the center may differ so much from the plotted location of such points, that it becomes necessary to reproduce such plates on the scale which will equalize the plotted and the photographic distance between such points. This positive is then reprojected to produce a negative of the required size, and this negative upon reproduction in equal size will yield a new positive suitable for tracing. Roads, railroads, rivers, buildings, canals and whatever features required on the final map are now traced in the sectional tracings. When the entire area to be mapped has been so treated, the sectional tracings are oriented again on the plot-drawing, and the final map tracing is now obtained by the juxtaposition under it of the several sectional tracings, each as oriented on the plot-drawing. In this manner topographical maps are produced by our novel method from aerial photographs exposed in non-stabilized cameras.

The method for converting the conical projections of the several views to their equivalent orthographic projections has in part been disclosed in an article entitled Air-Service Information Circular, published by the Chief of Air-Service, Washington, D. C. vol. 2, March 10, 1921, pages 20, 21. The accuracy of the results obtained in this manner depends entirely on the horizontality of the conical projections and on the accuracy with which the actual centers and conjugate centers of succeeding views can be located. As explained in the article referred to, frequent use is made of substitute centers owing to the difficulty of accurately locating the conjugates of the actual centers and the use of views corrected to equivalents of horizontal projection is not mentioned at all, reliance being had on a supposedly sufficient but altogether uncontrolled horizontality of the views considered in the article cited.

The methods adapted for the location of all conjugate centers in accordance with this invention, and the control on the horizontality of the corrected views resulting from the ascertaining by actual measurement in the field of the elevation of certain salient points occurring throughout the series of views used in accordance with the methods set forth herein, constitute thus a desirable advance in the art of making maps from aerial photographs as compared to the best methods known heretofore in this art.

In the practice of our method herein described a view which has been corrected to a preceding view, is not used as the master plate from which the succeeding plate is corrected, but a new examination of the original of such a corrected view is made in combination with the original of the succeeding view. This practice has been adopted after considerable careful experimentation had shown that continued correction of a following view to its preceding corrected view, gradually lead to errors, due primarily to an accumulation of slight uncorrected errors in previous views, sometimes aggravated by the effects due to a slight curvature sometimes found in the plates. In the latter instance the image for so far as it corresponds with the plate following the curved plate may have been projected in a plane of stronger inclination than that of its original exposure, while the part corresponding to the plate to which such curved image was corrected has been materially improved. This circumstance forms a further reason for the use of ground points of known elevation throughout the entire extent of the territory to be mapped.

While in accordance with the provisions of the statutes, we have illustrated and described the best forms of our invention now known to us, it will be apparent to those skilled in the art that changes can be made in the form of our invention without departing from its spirit, and that some features of our invention can be used without a corresponding use of other features.

Having now described our invention, what we claim as new and desire to secure by Letters Patent, is:

1. In the art of making topographical maps from aerial photographs, the method of preparing pairs of photographic plates suitable for use as stereoscopic pairs which consists in taking a series of photographic negatives from a moving aerial vehicle in such manner that adjacent negatives will show in part the same territory, selecting from said series of views a series of pairs showing in part the same territory and each of which includes a point which is at the center of the other selected view, ascertaining by survey the elevation of salient points in territory shown on both views of such pairs, measuring the distances of selected salient points from the line connecting the center point of each view with the conjugate center point of the other view of the pair, and measuring the parallaxes of points of known elevation as they appear in said views, to ascertain approximately the angle and degree of tilt of said views with reference to a horizontal focal plane and with reference to each other, and reprojecting said views on planes tilted to correct ascertained deviations, to so form a stereoscopic pair of positive plates having ordinates and parallaxes commensurate with horizontal projections in the view point of each plate of such pair.

2. In the art of making topographical maps from aerial photographs, the method of preparing pairs of photographic plates suitable for use as stereoscopic pairs which consists in taking a series of photographic negatives from a moving aerial vehicle in such manner that adjacent negatives will show in part the same territory, selecting from said series of views a series of pairs showing in part the same territory and each of which includes a point which is at the center of the other selected view, ascertaining by survey the elevation of salient points in territory shown on both views of such pairs, selecting from each such pair the plate which most closely approximates to the character of a view taken from a camera having a horizontal focal plane, producing from the negative of said plate a positive reproduction, adjusting the negative of the other member of the selected pair in such manner that the image projected by it will show salient points common to both plates to be located at the same distance from the line connecting the center points appearing on both plates and also in such manner that the parallaxes of the salient points of known elevation will correctly appear in the projected image and preparing from the negative plate a positive reproduction in the plane so adjusted to form with the other selected plate a stereoscopic pair.

3. In the art of making topographical maps from aerial photographs, the method of preparing pairs of photographic plates suitable for use as stereoscopic pairs, which consists in taking a series of photographic negatives from a moving aerial vehicle in such manner that adjacent negatives will show in part the same territory, selecting from said series of views a series of pairs showing in part the same territory and each of which includes a point which is at the center of the other selected view, ascertaining by survey the elevation of salient points in territory shown on both views of such pairs, selecting from each such pair the one which most closely approximates to the character of a view taken from a camera having a horizontal focal plane, producing from the negative of said plate a positive reproduction on a glass plate, producing from the positive plate so prepared a template photograph on glass, positive in position and negative in color, projecting on said template the negative of the other member of the selected pair and adjusting the relative positions of said template and negative so that salient points appearing on both plates will in the projected image lie at the same distance from the line connecting the center points as do said points in the template, further adjusting said template and negative so that the parallaxes of the salient points of known elevation will correctly appear in the image projected on the template and preparing from the negative plate a positive reproduction on glass in the plane of projection adjusted to the angles so determined to form with the positive of the selected plate a stereoscopic pair, with ordinates and parallaxes commensurate with horizontal projections in the view point of each plate of such pair.

4. In the art of making topographical maps from aerial photographs, the method of preparing pairs of photographic plates suitable for use as stereoscopic pairs which consists in taking a series of photographic negatives from a moving aerial vehicle in such manner that adjacent negatives will show in part the same territory, selecting from said series of views a series of pairs showing in part the same territory and each of which includes a point which is at the center of the other selected view, ascertaining by survey the elevation of salient points in territory shown on both views of such pairs, examining the selected pairs to determine if such pairs include a view sufficiently close to a horizontal projection to serve as a master plate, producing from the negatives of said plates positive reproductions on glass plates, producing from the positive plates so prepared template photographs on glass, positive in position and negative in color, projecting on said templates the negatives of the other members of the selected pairs and adjusting the relative positions of said templates and negatives so that salient points appearing on both plates will in the projected image lie at the same distance from the line connecting the center points as do said points in the templates, further adjusting said templates and negative so that the parallaxes of the salient points of known elevation will correctly appear in the images projected on the templates, and preparing from the negative plates positive reproductions on glass in the planes of projection adjusted to the angles so determined, to form with the positives of the selected plates, stereoscopic pairs, with ordinates and parallaxes commensurate with horizontal projections in the view point of each plate of such pair.

5. In the art of making topographical maps from aerial photographs, the method of preparing pairs of photographic plates suitable for use as stereoscopic pairs which consists in taking a series of photographic negatives from a moving aerial vehicle in such manner that adjacent negatives will show in part the same territory, selecting from said series of views a series of pairs showing in part the same territory and each of which includes a point which is at the center of the other selected view, ascertaining by survey the elevation of salient points in territory shown on both views of such pairs, examining the selected pairs to determine if such pairs include a view sufficiently close to a horizontal projection to serve as a master plate, reprojecting the negatives of such pairs of plates as do not comprise one sufficiently close to a horizontal projection to serve as a master plate, so as to form a reprojected pair, one of which is sufficiently close to a horizontal projection to so serve, producing from the positive plates so prepared or selected template photographs on glass, positive in position and negative in color, projecting on said templates the negatives of the other members of the selected pairs and adjusting the relative positions of said templates and negatives so that salient points appearing on both plates will in the projected image lie at the same distance from the line connecting the center points as do said points in the template, further adjusting said templates and negatives so that the parallaxes of the salient points of known elevation will correctly appear in the images projected on the templates and preparing from the negative plates positive reproductions on glass in the planes of projection adjusted to the angles so determined, to form with the selected positives of such pairs, stereoscopic pairs, with ordinates and parallaxes commensurate with horizontal projections in the view point of each plate of such pair.

6. In the method of claim 3, the preferred method of preparing the template in which a stencil, cut out to expose only salient positions of the selected positive plate is used, and the template positive in position and negative in color is produced from said partially covered plate.

7. In the method of claim 3, the preferred further step by which in preparing the template the point on the selected plate which corresponds to the point constituting the optical center of the plate to be projected on the template is projected on the mechanical center of the template.

8. In the art of making topographical maps from aerial photographs the described method of preparing pairs of photographic plates suitable for use as stereoscopic pairs in which a series of photographic negatives are taken from an aerial vehicle in such manner that successive negatives will show views of common territory extending over more than two thirds of the negatives and alternate negatives will embody views of the same territory located at opposite ends of the negatives, selecting from said negatives a series of pairs, each made up of alternately taken negatives, each of which includes a point which is at the center of the other selected negative, ascertaining by survey the elevation of salient points in territory shown on both views of the selected pairs, measuring the distances of selected salient points from the line connecting the center point of each view with the conjugate center point of the other view of the pair, and measuring the parallaxes of points of known elevation as they appear in said views, to ascertain approximately the angle and degree of tilt of said views with reference to a horizontal focal plane and with reference to each other, and reprojecting said views on planes tilted so as to correct ascertained deviations, to so form a stereoscopic pair of positive plates having ordinates and parallaxes commensurate with horizontal projections in the view point of each plate of such pair.

9. In the practice of the method as set out in claim 1, the step preliminary to the reprojection of one or both plates of a selected pair which consists in submitting a pair of views prior to reprojection, to examination and measurement in a measuring stereoscope having cross hairs in each eye piece, to ascertain approximately from the comparison of ordinates of conjugate points on said plates and from the comparison of parallax differences of points of known elevation with the calculated parallaxes of such points, what if any reproduction of the negative of said plate in a tilted plane or reproduction is required, to obtain reprojected positives having ordinates and parallaxes commensurate with horizontal projections.

10. In the art of making topographical maps from aerial photographs, the described method consisting in taking an overlapping series of photographic negatives from an aerial vehicle so spaced that adjacent negatives will show in part the same territory, selecting from said negatives a series of pairs each of which shows in part the same territory and each of which includes a point which is at the center of the other selected plate, ascertaining by survey the elevation of salient points in territory shown on both views of said pairs, measuring the distances of selected salient points from the line connecting the center point of each view with the conjugate center point of the other view of the pair, and measuring the parallaxes of points of known elevation as they appear in said views, to ascertain approximately the angle and degree of tilt of said views with reference to a horizontal focal plane and with reference to each other, and reprojecting said views on planes tilted so as to correct ascertained deviations, to so form a stereoscopic pair of positive plates having ordinates and parallaxes commensurate with horizontal projections in the view point of each plate of such pair, then placing said corrected stereoscopic pairs in a suitable stereoscope, adjusting each plate so that the line connecting the centers and conjugate centers in both plates is parallel to the line connecting the centers of the eye pieces of the stereoscope, adjusting the separation of the plates until apparent coincidence occurs between points of the photographic stereoscopic image and the stereoscopic image formed by optical objects placed in the focal plane of the eye pieces of the stereoscope, tracing on one of the plates the contour lines so observed, shifting the plates in the stereoscope to an extent corresponding to a predetermined difference of elevation and again tracing on the plate the contour line obtained by the apparent coincidence of points in the photographic stereoscopic image with the optical stereoscopic image in the new spaced relation of the plates.

11. In the practice of the method as set out in claim 1, the method of correctly locating conjugate center points on the stereoscopic pairs of plates which consists in placing a pair of plates in a suitable stereoscope having cross hairs in each eye piece, bringing the stereoscopic image of the intersection of the cross hairs into apparent contact with the stereoscopic image of the center of one of the plates by adequate regulation of the distance between the two plates, thereby bringing the cross hairs of the eye piece of the other plate into coincidence with the conjugate center of the first plate as found on the second plate and then marking said coincident point on the second plate.

12. The method of plotting a photographic traverse in orthographic projection from a series of overlapping photographic views taken from a moving aerial vehicle, which consists in selecting from said views a series of pairs showing in part the same territory and each including a point which lies at the center of the other view of the pair, stereoscopically locating said conjugate center point in each plate of the pair, ascertaining by survey the elevation of salient points in the territory shown on both views of the selected pairs, correcting the views to substantial horizontality by such reprojection as will produce equal ordinates and correct parallaxes of salient points of ascertained elevation, making plotting-tracings from the corrected plates with their stereoscopically located conjugate centers, with lines passing through points to be plotted and through the center of each plate in which said points occur and lines uniting the center and conjugate center of each plate, marking on one of said plot tracings the actual location of two points to which direction has been traced, transferring to a plot drawing all the directions contained on the first tracing and the actual location of the two points selected, aligning the second plotting-tracing so that the line uniting its center with the conjugate center of the first tracing coincides with the reverse direction of this line as drawn on said plot drawing, sliding said second tracing along said line until the direction from the center of said tracing to the points located on the plot drawing pass through these points; when so located, marking the position of the center of the second tracing, and the directions to all points marked thereon, thereby forming points of intersection with directions already transferred from the first tracing, to thereby locate points determined by these two directions, then similarly aligning the third and following tracings, each time regulating the center distance, so that directions to points located by previous intersections pass through these points.

13. In the method of preparing a photographic traverse in orthographic projection as set forth in claim 12, the further step of composing a mosaic map suitable for use in connection with orthographically projected maps so prepared which consists in reproducing negatives from the previously corrected plates in the scale derived from the orthographic plot drawing, by regulating the distance between the center and the conjugate center of such reproduced negatives to be equal to the corresponding distance between these points as plotted, when the center point of such negative is in lower ground elevation than the conjugate center point, and by regulating said center distance to equal the plotted center distance augmented by the parallax corresponding to the difference in ground elevation between the center and conjugate center, whenever such center is in higher ground elevation than such conjugate center, then preparing photographic prints from the negatives so scaled and combining said prints into a mosaic map as set forth.

ARTHUR BROCK, Jr.
LODEWYK J. R. HOLST.